No. 703,407. Patented July 1, 1902.
A. D. HALE.
ANIMAL POKE.
(Application filed Oct. 19, 1901.)
(No Model.)
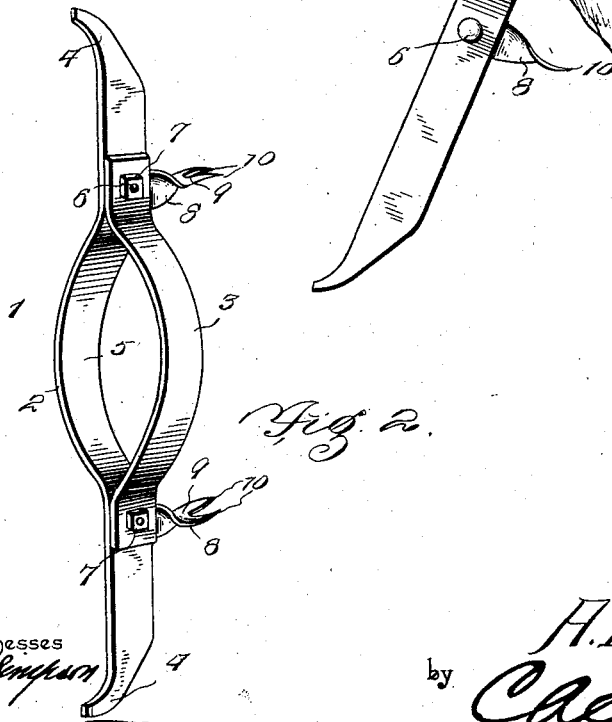
Witnesses
A. D. Hale Inventor
by
Attorneys
THE NORRIS PETERS CO., PHOTO-LITHO., WASHINGTON, D. C.

UNITED STATES PATENT OFFICE.

ASA D. HALE, OF EAGLEVILLE, MISSOURI.

ANIMAL-POKE.

SPECIFICATION forming part of Letters Patent No. 703,407, dated July 1, 1902.

Application filed October 19, 1901. Serial No. 79,288. (No model.)

*To all whom it may concern:*

Be it known that I, ASA D. HALE, a citizen of the United States, residing at Eagleville, in the county of Harrison and State of Missouri, have invented a new and useful Animal-Poke, of which the following is a specification.

This invention relates to animal-pokes.

The object is to present a simply-constructed, highly-efficient, durable, and readily-applicable form of poke which will be thoroughly effective in preventing breachy cattle from creeping through, crawling under, or jumping over a fence and which will not interfere with the animal when grazing or reclining.

With these and other objects in view, as will appear as the nature of the invention is better understood, the same consists in the novel construction and combination of parts of an animal-poke, which will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the scope of the invention, and in these drawings—

Figure 1 is a view in side elevation of an animal's head, showing the poke positioned thereon. Fig. 2 is a view in perspective of the poke detached, the view being taken from a different side of the poke from that shown in Fig. 1 in order clearly to exhibit the fastening means by which the members of the structure are held assembled.

Referring to the drawings, 1 designates generally the poke, comprising two members 2 and 3, constructed of flat bar metal, the extremities of the member 2 being bent to form hooks 4, which are adapted to engage with the bars or line-wires of a fence when an animal wearing the poke attempts to creep through, crawl under, or jump over the fence, and thereby prevent it from leaving the field or inclosure in which it is desired to confine the animal. The member 2 is provided intermediate of its ends with an outward bulged or bowed portion 5, constituting one side of the yoke, the other side of which is formed by the member 3, which is similarly bowed for the same purpose, the terminals of the member 3 being straight to aline with portions of the member 2 adjacent to the yoke, and both of the members 2 and 3 are provided with transverse openings to be engaged by bolts 6, carrying nuts 7, by which the two members of the poke may be held securely assembled and yet be readily detached when desired. As herein shown, the heads of the bolts bear against the member 2 of the yoke and the nuts against the member 3 thereof; but it is to be understood that this order of arrangement may be reversed, if found necessary or desirable. The opening formed between the two members 3 and 4 is substantially elliptical, whereby when the poke is positioned upon the animal's neck it will conform closely thereto and will be held against lateral rocking thereon, thus to cause the hooks 4 always to be in position to perform the function for which they are designed. It is to be understood that the curvature of the hooks 4 may be increased, if desired, and as this will be obvious detailed illustration thereof is deemed unnecessary.

The prods, which are provided to prick the animal's neck to cause it to desist in any effort it may make to force its way through a fence, consist in this instance each of a plate of metal, the flat side of which is clamped between the members 2 and 3 by the bolts 6 and nuts 7, the prods being provided with openings through which the bolts will pass. The plate of metal forming the prod is twisted in a quarter-turn, as at 9, thereby to bring the flat side of the outer end of the plate at right angles to the length of the poke, and the outer ends of the plates 8 are split or bifurcated and pointed to present prods 10, which, as will be readily understood by reference to Fig. 1, will upon rearward thrust being applied to the poke prick the animal's neck or throat and will thus perform the function designed. The form of prod herein shown is desirable on account of the simplicity of its construction and the readiness with which it may be replaced in case of damage or breakage; but it is to be understood that the invention is not to be limited to this precise arrangement, as other forms of prods within the scope of the invention may be employed, if found necessary or desirable.

It will be seen from the foregoing description that the poke of this invention is exceedingly simple of construction and may therefore be readily manufactured and sold at a nominal figure. By reason of its disposition upon the animal's neck it will not present an obstruction that will interfere with its comfort when reposing or grazing, thereby eliminating an objectionable feature common to devices of this character.

Having thus fully described my invention, what I claim as new, and desire to secure by Letters Patent, is—

An animal-poke comprising two members bowed to conform to the shape of the animal's neck, one of the members having its terminals curved forward to present fence-engaging means, prods constructed each of a flat piece of metal having one end bifurcated to present prongs and twisted at right angles midway of its length to cause the prongs to be transversely disposed with relation to the fence-engaging means and its other end arranged between the poke members, and fastening devices for rigidly clamping the poke members and the prods together, said devices passing through the terminals of the prods, substantially as and for the purpose specified.

In testimony that I claim the foregoing as my own I have hereto affixed my signature in the presence of two witnesses.

ASA D. HALE.

Witnesses:
G. I. HALE,
C. CARYL.